United States Patent
Carlson

(10) Patent No.: US 7,028,901 B2
(45) Date of Patent: Apr. 18, 2006

(54) SYSTEM AND METHOD FOR READING AND DECODING OPTICAL CODES USING MULTIPLE COLOR ILLUMINATION

(75) Inventor: Bradley S. Carlson, Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 155 days.

(21) Appl. No.: 10/621,831

(22) Filed: Jul. 17, 2003

(65) Prior Publication Data

US 2005/0011956 A1    Jan. 20, 2005

(51) Int. Cl.
*G06K 7/10* (2006.01)

(52) U.S. Cl. .......................... 235/462.04; 235/462.06; 235/462.11

(58) Field of Classification Search .......... 235/462.04, 235/462.06, 462.1, 462.11, 462.44
See application file for complete search history.

(56) References Cited

U.S. PATENT DOCUMENTS

| | | |
|---|---|---|
| 5,361,158 A | 11/1994 | Tang |
| 5,773,808 A | 6/1998 | Laser |
| 2003/0062413 A1 | 4/2003 | Gardiner et al. |

FOREIGN PATENT DOCUMENTS

EP    0516927 A2    3/1992

*Primary Examiner*—Karl D. Frech
(74) *Attorney, Agent, or Firm*—Carter, DeLuca Ferrell & Schmidt, LLP

(57) ABSTRACT

An optical code reading system and method are provided for reading and decoding an optical code. The system includes a plurality of light sources, a color image sensor, a processor and a decoder. Each light source produces a unique wavelength/color of light to illuminate the optical code, such as a direct mark optical code. The image sensor detects the reflected light from the optical code and generates an integrated multi-colored image. The processor separates the integrated image into individual color channels, where each color channel includes data representative of the imaged optical code in one color. The processor analyzes the contrast for each color channel and determines which color channel has the optimum contrast. The data corresponding to the color channel having the optimum contrast is then decoded by a decoder.

41 Claims, 10 Drawing Sheets

SYSTEM AND METHOD FOR READING AND DECODING OPTICAL CODES USING MULTIPLE COLOR ILLUMINATION

BACKGROUND OF THE INVENTION

1. Field of the Invention

This invention relates to imaging using optical code reading devices. In particular, this invention relates to a system and method for reading and decoding optical codes using multiple color illumination.

2. Description of the Prior Art

As industry has continued to refine and improve production techniques and procedures, corresponding requirements have been levied for placing identifying data related markings upon components of manufactured assemblies. These markings enable tracking of, for example, the historical stages of a product's manufacture. Further, these markings enable components of complex machinery, such as automobiles and the like, to be identified, for example, during manufacture by quality control personnel, during the course of an investigation by governmental authorities, etc.

A variety of product marking approaches has been utilized in industry. For example, paper tags or labels carrying UPC codes are typically applied to components in the course of a product's assembly. This method provides identifying codes that are highly readable by prior art optical code readers. However, for many applications, such tags or labels may be lost, damaged or altered, thereby, rendering the coding useless. This shortcoming is well addressed by Direct Part Marking (DPM) and consequently DPM has gained widespread acceptance in industrial applications by providing durable markings, or code symbols, capable of being placed on a wide variety of surfaces.

DPM is the technique of directly imprinting or etching product and component surfaces with codes corresponding to a plurality of symbologies, and, in particular, high-density 2-D code symbologies, such as Data Matrix and QR Code. However, as a result of being etched directly onto a wide variety of material surfaces and textures, such as reflective or dark surfaces, properly illuminating, reading (and subsequently decoding) DPM codes is typically not possible with conventional code reading systems.

Readability of an imaged optical code is most often determined by contrast between the code symbol and its background surface. Optical codes, such as UPC symbols, printed on labels provide high contrast through selection of background and foreground colors—usually black geometrical shapes or foreground on a white background. The DPM method of marking objects with DPM codes does not have the luxury of selecting the background color or even a foreground color for the symbol markings, especially in the case of etching and dot peening (indention marking). Therefore, DPM codes often have low and inconsistent contrast resulting in low code readability, and subsequently, many misreads or no reads.

Accordingly, proper lighting is often necessary for reading and decoding DPM codes. Further, the precise angle of the originating light source, with respect to the DPM codes, needs to be controlled in order for the variations in surface texture created by the marking method to reflect the light with different intensities. Surface background conditions that are reflective, or yield very little visible symbol contrast to the naked eye under general ambient lighting, can become highly visible when illuminated by a light source at a given angle from the surface.

Conventional direct mark imaging systems and imagers use directional illumination to obtain contrast in dot-peened and laser-etched DPM code symbols. These systems and images include several banks of LEDs that are switched on at different times to illuminate and image a DPM code from various directions with the same color. The image with highest contrast is then selected for decoding.

As shown by FIGS. 1a–1c, each of the three images of FIG. 1 illustrate a DPM code being illuminated from three respective illumination directions using the same colored illumination. The contrast of the DPM code varies with each of the illumination directions. Successful decoding of the DPM code depends on properly illuminating the DPM code from at least one of the three different illumination directions to get at least one readable and decodable contrast of the DPM code.

Similar to the set up shown by FIGS. 1a–1c, prior art DPM or other imagers utilize monochrome detector arrays for acquiring a DPM code in three separate imaging frames. Each frame represents the DPM code as illuminated from a different illumination direction. Each image requires an acquisition time of about 30 ms, thereby requiring, at a minimum, 90 ms for data acquisition and decoding of DPM codes by prior art imagers.

The long acquisition time is mainly due to prior art imagers using a light source capable of illuminating using a single color or relying on ambient light for illumination. Hence, prior art imagers can only image a DPM code from one illumination direction at a time. Therefore, typically, after images corresponding to each illumination direction are acquired, can a prior art imager proceed with the processing of the acquired images to determine likelihood of decodability for each image.

SUMMARY OF THE INVENTION

It is an aspect of the present invention to provide a system and method for reading and decoding optical codes using multiple color illumination.

Another aspect of the present invention is to provide a system and method for simultaneously imaging a DPM code or any type of optical code from three different illumination directions using multiple color illumination to reduce the time required for image acquisition and decoding compared to prior art imagers.

Another aspect of the present invention is to provide a system and method for illuminating and imaging a DPM code or any type of optical code using a plurality of differently colored illumination sources for illuminating the DPM code or optical code from a plurality of illumination directions, providing simultaneous multi-directional image acquisition of the DPM code or optical code, separating the acquired image into its respective single-colored images, and determining which single-colored image is most suitable for decoding.

A system and method for reading and decoding optical codes using multiple color illumination is herein disclosed which achieves these and other aspects of the present invention. The system and method of the present invention utilize a color image sensor, such as CCD or CMOS color image sensor, enabling simultaneous acquisition of three monochrome images each having a different color, such as, for example, a red-colored image, a green-colored image, and a blue-colored image, as one superimposed, integrated image (i.e., one image frame). Each monochrome image of the integrated image corresponds to a DPM code or any other type of optical code. Each monochrome image is acquired by the image sensor after being illuminated by three different color light sources. The three different color light sources are provided in three corresponding banks of LEDs and oriented for providing simultaneous illumination from three different illumination directions. Each illumination direction corresponds to one of the three color light sources. The three monochrome images corresponding to each of the three banks of LEDs are acquired simultaneously as an integrated image by the image sensor, thereby decreasing overall image acquisition time by at least 66% compared to prior art direct part mark imaging systems.

A processor is provided and programmed for determining which acquired monochrome image of the three different monochrome images of the integrated image corresponding to the illuminated optical code, provides an optimum decodable image. The processor determines which of the three monochrome images provides an optimum decodable image by first separating the individual monochrome images from the integrated image into three respective color channels. The processor then analyzes the contrast, or other parameter, of the color channel data corresponding to each color channel for determining a contrast level for each color channel. The data corresponding to the color channel having the most optimum contrast is then decoded by a decoder.

The information encoded by the DPM code and decoded by the system of the present invention may be an identifying string of alphanumeric characters or a data file. The decoded information can be processed in a manner appropriate for a particular application, which may include using the decoded information for retrieving data stored in a database and/or adding the decoded information to a product tracking system, such as a database or inventory system.

BRIEF DESCRIPTION OF THE DRAWINGS

These and other features, aspects, and advantages of the present invention will become better understood with reference to the below listed drawings, and detailed description of the invention:

FIG. 2b illustrates a flowchart of an exemplary method of operation of the optical code reading system as shown in FIG. 2a;

DETAILED DESCRIPTION OF THE PREFERRED EMBODIMENTS

The present invention is suited for reading and decoding optical codes using multiple color illumination. The invention is particularly designed for imaging, reading and decoding DPM codes corresponding to a wide range of standardized 1-D and 2-D symbologies and even 3-D (multi-color) symbologies by incorporating the corresponding decoding and code identification algorithms for each code symbology within a logic board configured for providing image processing and decoding as known in the art and as discussed in further detail below. Accordingly, the present invention is discussed with a particular emphasis on imaging, reading and decoding DPM codes, even though the systems and methods of the present invention can be used to image and decode non-DPM codes.

The present invention provides a system and method that utilize a color image sensor, such as a CCD or CMOS color image sensor, enabling simultaneous acquisition of three monochrome images each having a different color, for example, a red-colored image, a green-colored image, and a blue-colored image, as one superimposed, integrated image (i.e., one image frame). Each monochrome image of the integrated image corresponds to a DPM code or any other type of optical code acquired by the image sensor after being the DPM code is illuminated by three different color light sources. The three different color light sources are provided in three corresponding banks of LEDs and oriented for providing simultaneous illumination from three different illumination directions forming an illumination pattern substantially illuminating the entire DPM code. Each illumination direction corresponds to one of the three color light sources. The three monochrome images corresponding to each of the three banks of LEDs are acquired simultaneously by the image sensor, thereby decreasing overall image acquisition time by at least 66% compared to prior art direct part mark imaging systems. It is contemplated that several of the LEDs in each bank are aiming LEDs and the rest are illumination LEDs.

There are various color image sensing methods available, any one of which may be incorporated in the system and method of the present invention. Three specific examples are full-color image sensing using a full color image sensor, color filter array image sensing using a color filter array sensor, and image sensing using an assembly composed of three monochrome sensors with a prism. A preferred embodiment of the present invention uses a full-color image sensor, such as a CCD or CMOS color image sensor. The use of a color filter array sensor requires a larger number of pixels because each color has less than full resolution. The use of a prism with three sensors is expensive due to high manufacturing costs.

Figure 1A:
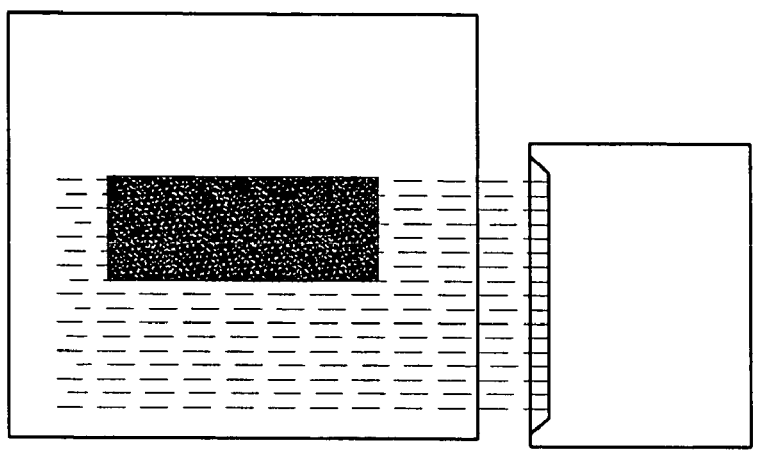
FIG. 1a–1c illustrates an optical code illuminated from three different directions according to prior art methodology.
Figure 1B:
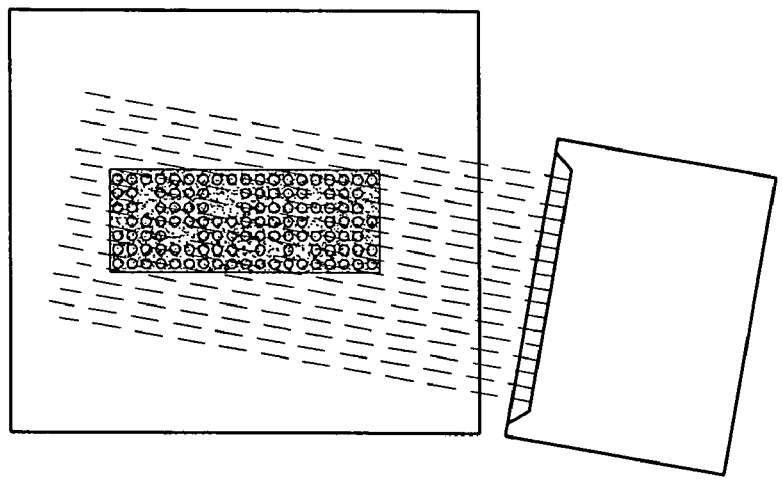
Figure 1C:
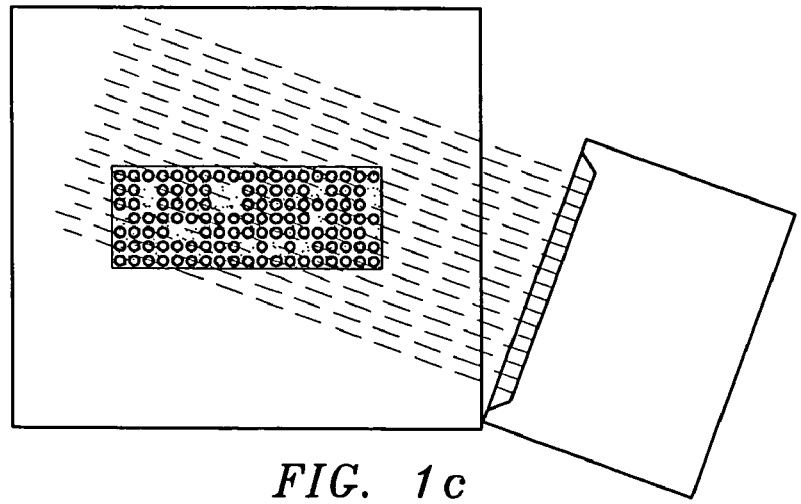
Figure 2A:
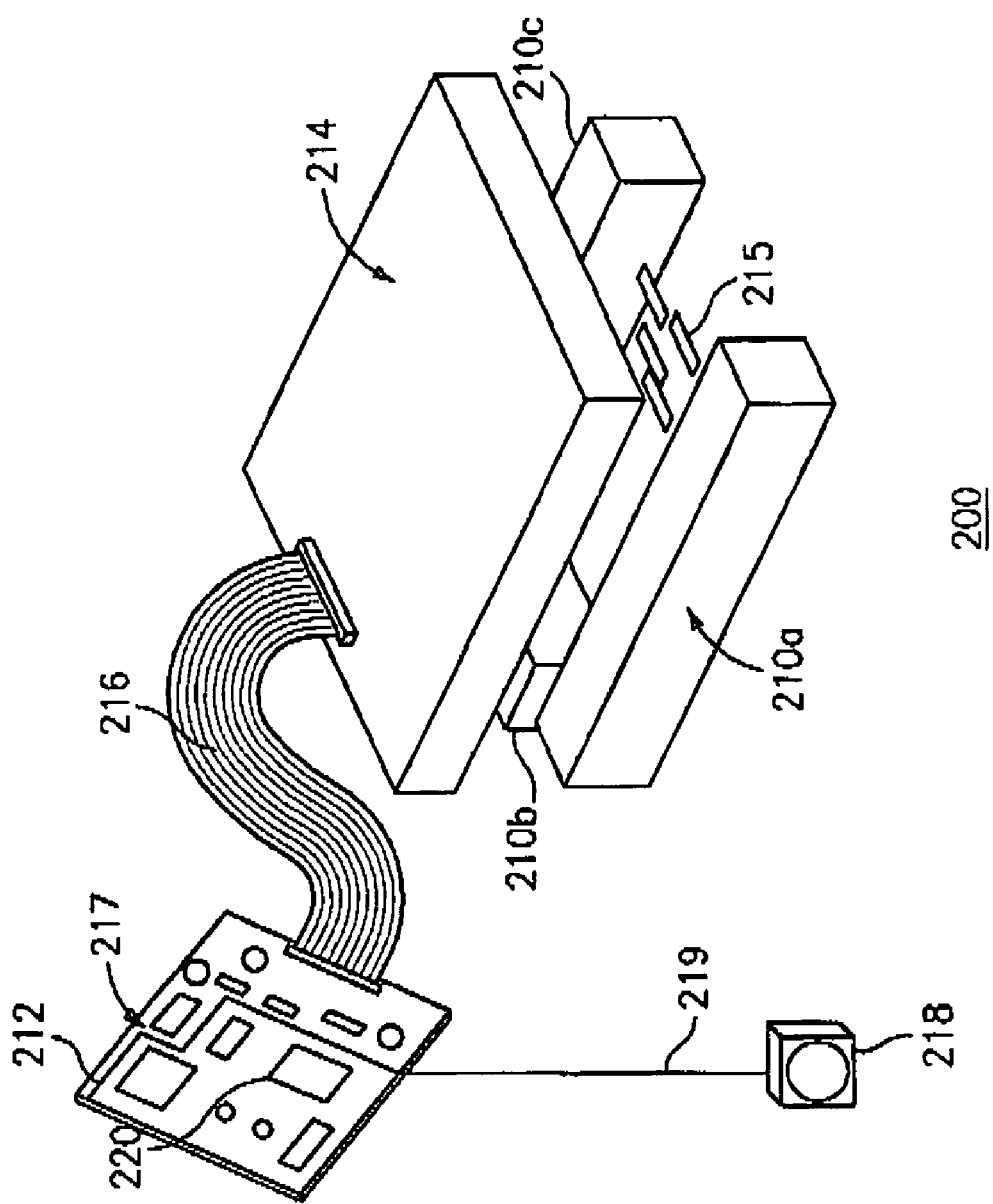
FIG. 2a is a schematic view of the internal components of a optical code reading system in accordance with the present invention.

A description of the embodiments shown in the drawings follows where identical reference numerals identify identical elements or components in the various drawings. With reference to FIG. 2a, there is shown the internal components of an imager or scan unit 315 of an optical code reading and decoding system 300 (see FIG. 3a) in accordance with the present invention. The internal components are referenced by reference numeral 200. The scan unit 315 includes three light sources 210a–ca, 210b and 210c. Each of the light sources 210a–c is preferably an LED array capable of illuminating an external field of view located distally from the scan unit 315 with a different color. Therefore, each light source 210 illuminates an external target with a different wavelength of light. That is, each light source 210 provides a different colored illumination.

Preferably, light source 210a provides a red colored illumination, light source 210b provides a green colored illumination, and light source 210c provides a blue colored illumination. It is contemplated that other wavelengths, i.e. ultraviolet, infrared, etc., can be used by the optical code reading and decoding system 300.

It is further contemplated that the type of codes that are to be imaged, the surface texture of an object having a code imprinted thereon, ambient lighting, and other factors can be used to determine the actual colors/wavelengths to be used for illumination by the optical code reading and decoding system 300. The optical code reading and decoding system 300 can be programmed to suggest to a user via an LED display, for example, which colors/wavelengths are best suited for illuminating a DPM code (or other optical code) 215, after the user inputs information regarding the one or more factors. It is still further contemplated to enable a user to readily unplug one or more of the light sources 210a–c and replace them with one or more other light sources capable of illuminating using different colors/wavelengths.

The illumination or output intensities of the light sources 210a–c can be independently adjustable, providing the ability to reduce power consumption, reduce glare, and generally improve contrast and image characteristics. The output intensities may be adjusted automatically by an illumination sensor system by sensing the ambient lighting and/or other parameters using at least one sensor 218, such as a photodetector. The at least one sensor 218 sends a control signal to a logic board 217 via control line 219. The control signal includes data indicative of the sensed parameters. During a scan portion of a scan and decode procedure, the logic board 217 adjusts the output intensities in accordance with the sensed parameters. At least one look-up table or other data structure can be accessed by the logic board 217 for correlating the sensed parameters and the output intensity for the light sources 210a–c.

Figure 3A:
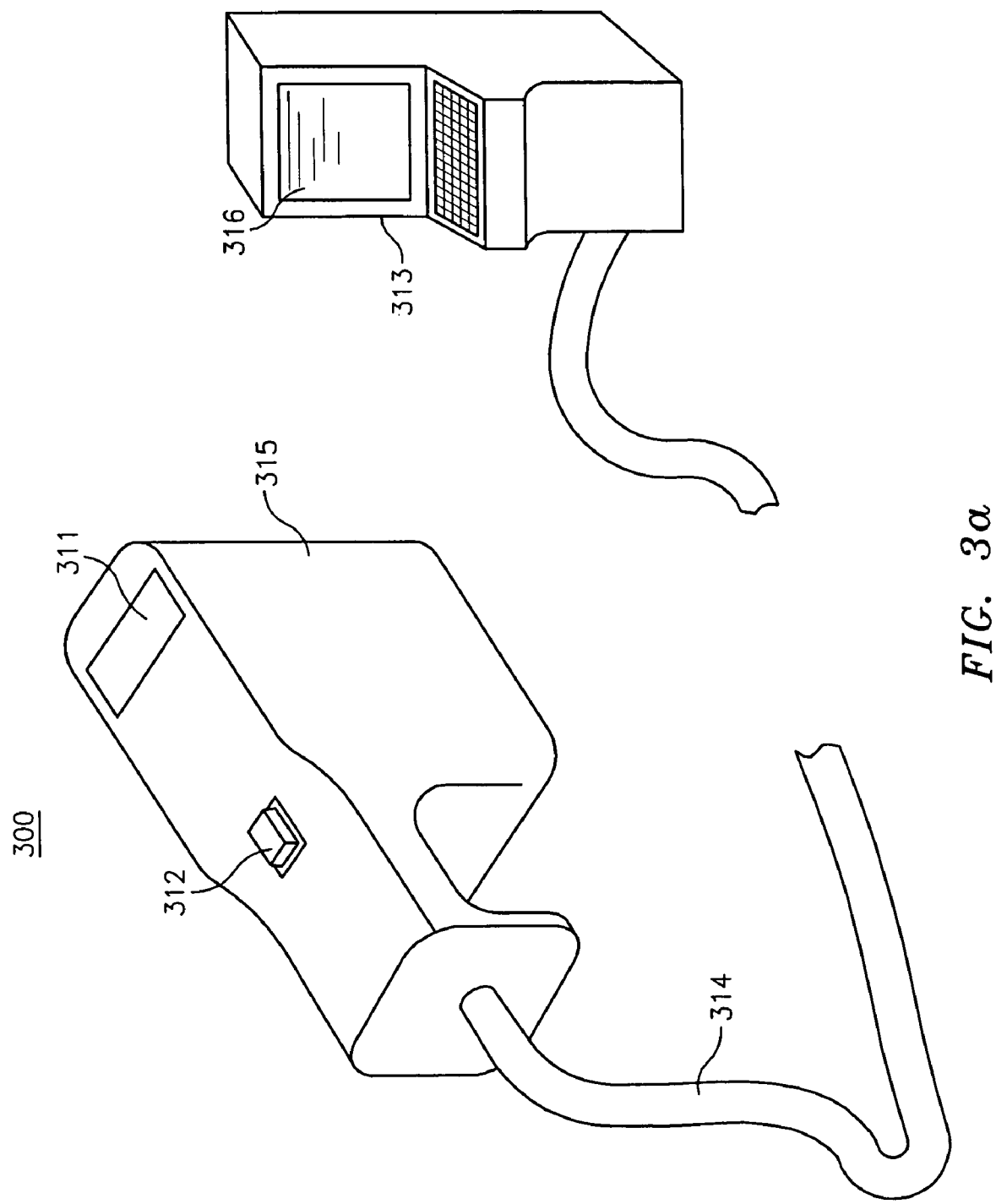
FIG. 3a is an external view of the optical code reading system including the components shown by FIG. 2a in accordance with the present invention.
Figure 3B:
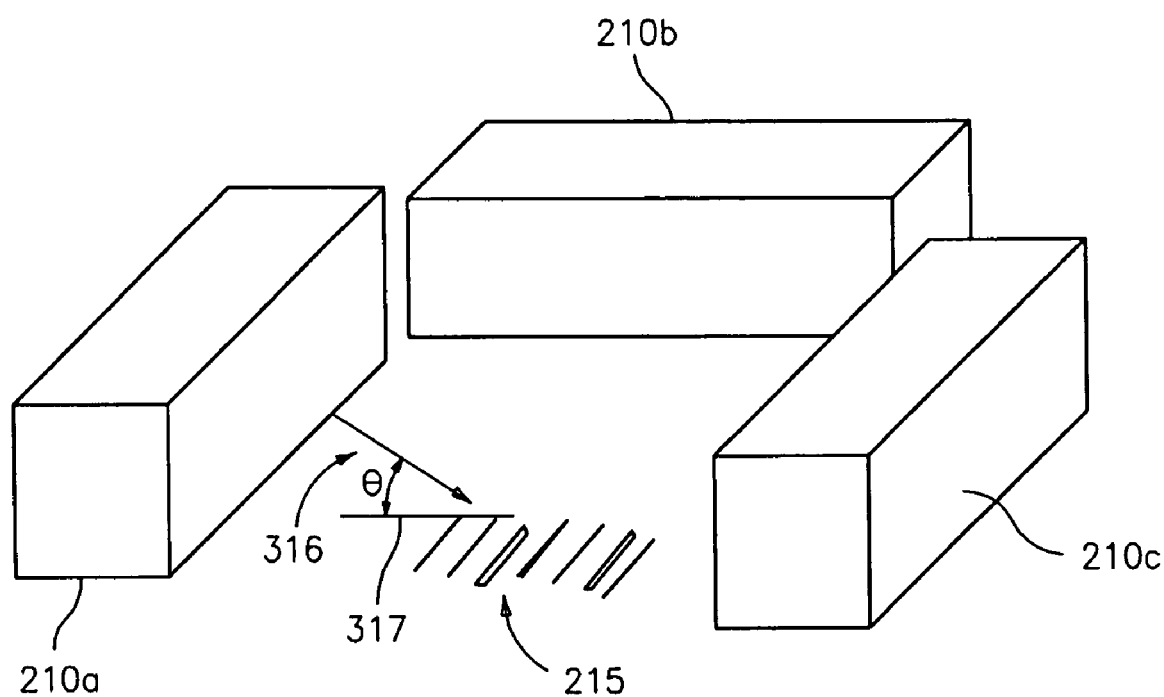
FIG. 3b is a schematic illustration of three light sources of the optical code reading system of FIG. 3a for illuminating an optical code in accordance with the present invention.

Each light source is disposed at a respective glancing angle with respect to the DPM code 215 as shown by FIG. 3b. The glancing angle θ is identified by reference numeral 317 in FIG. 3b and is preferably less than 45°. It is contemplated that one or more of the light sources 210a–c can be adjusted or shifted in position to change one or more of the glancing angles.

Figure 4A:
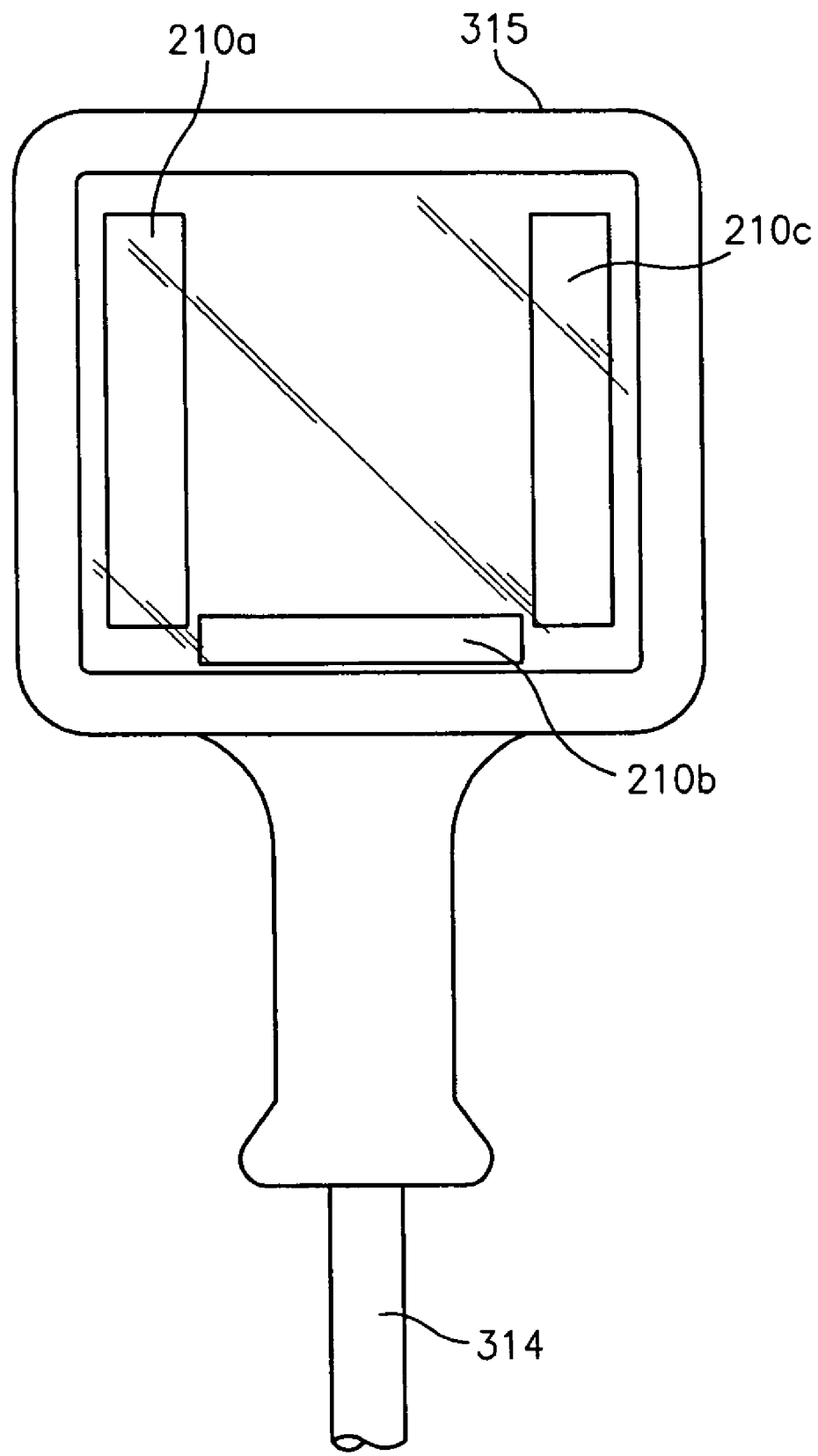
FIGS. 4a–c illustrate various front views for the optical code reading system of FIG. 3a showing different arrangements for the light sources in accordance with the present invention.
Figure 4C:
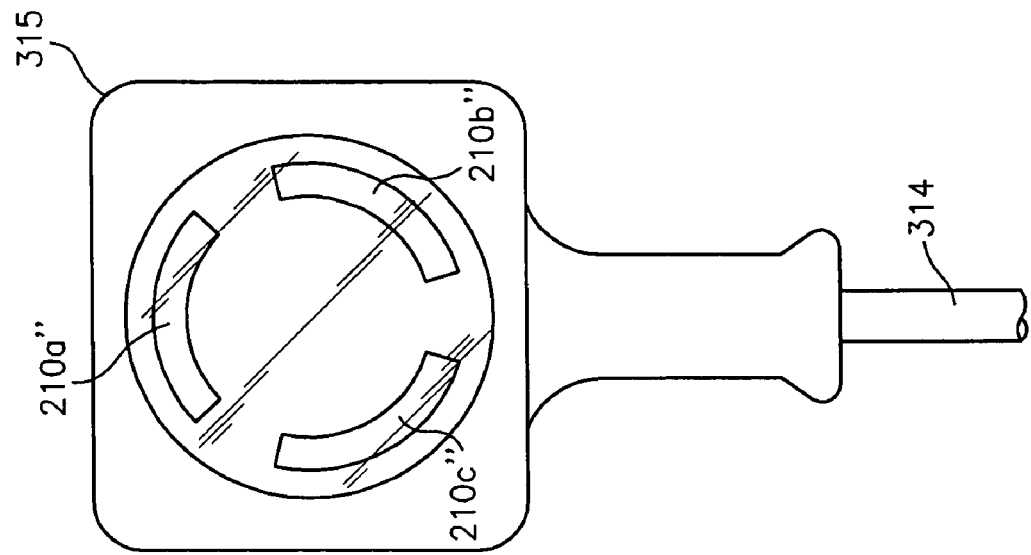
Figure 4B:
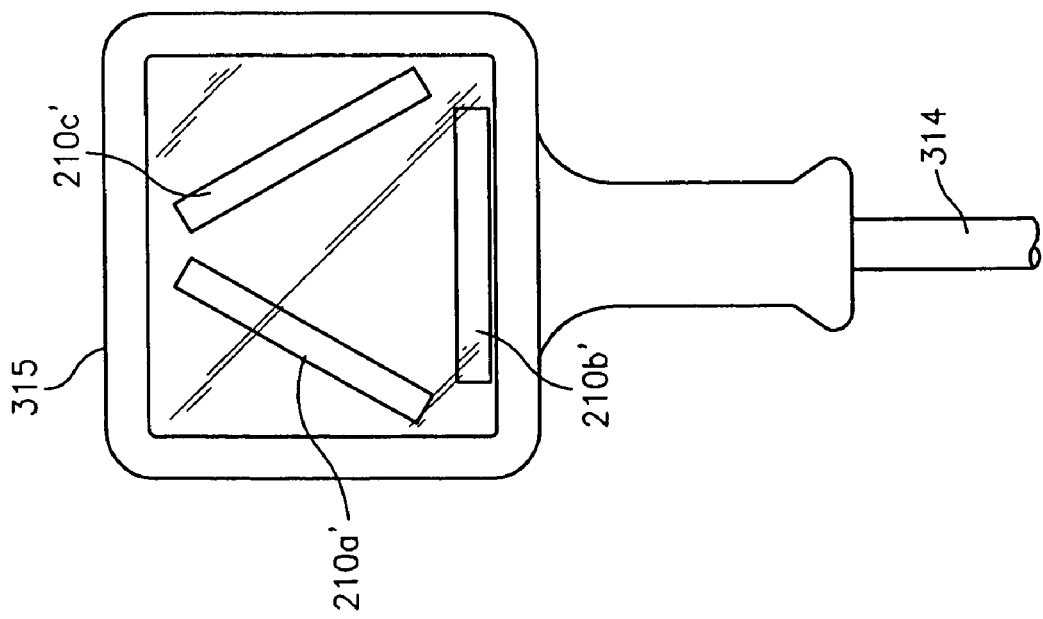

The light sources 210a–c are arrayed at discrete angles with respect to each other in order for each light source to illuminate the DPM code 215 from a different illumination direction compared to the other light sources. As an example, the three light sources 210a–c can be arranged in a U-shaped, triangular, or circular arrangements as shown by FIGS. 4a, 4b, and 4c, respectively. In FIGS. 4b and 4c, the light sources are designated by 210a'–c' and 210a''c''', respectively. It is contemplated that any number of light sources, each capable of emanating a unique wavelength of the electromagnetic spectrum, can be incorporated within optical code reading and decoding system 300.

One or more of the light sources 210a–c can be enabled and disabled by programming a processor 212 associated with the optical code reading and decoding system 300. The processor 212 is provided on the logic board 217 of the scan unit 315, as shown in FIG. 2a. The processor can also be an external processor, such as a host-based processor, located within a remote server or a terminal of the optical code reading and decoding system 300. The processor 212 is programmed with a set of programmable instructions capable of being executed by the processor 212 for performing the functions described herein in accordance with the present invention, such as controlling the light sources 210a–c.

The scan unit 315 further includes an image sensor 214 having associated circuitry capable of simultaneously detecting and acquiring individual monochrome images corresponding to each illumination color of the light sources 210a–c. The individual monochrome images are acquired as a single, superimposed, integrated image (i.e., one image frame) having image data representative of three color channels. The three color channels are separated by the processor 212 into separate color channels corresponding to each monochrome image using conventional color separation techniques. For example, if the monochrome images are red-, green-, and blue-colored, the color channels are red, green and blue. Data corresponding to each color channel are analyzed as further described below.

The light sources 210a–c and the image sensor 214 are connected to the logic board 217 via standard connection devices 216, i.e. ribbon cable, etc. The logic board 217 generates and provides control signals to the light sources 210a–c for activating the light sources 210a–c during the scan and decode procedure (and for deactivating the light sources 210a–c after the scan portion of the scan and decode procedure has been performed).

Control signals are also provided by the logic board 217 to the image sensor 214 for controlling the acquisition of the superimposed, integrated image and its associated image data. The image data, containing data corresponding to all three color channels, is transferred to the logic board 217. The processor 212, an ASIC, or a combination thereof, on the logic board 217 are configured and/or programmed for analyzing the color channel data to select the color channel having the greatest or optimum contrast. Alternatively, the color channel analysis may be carried out on the host-based processor, for example, a processor of an I/O device 313 (see FIG. 3a).

Once the color channel with the optimum contrast is selected, the respective data from that channel is decoded using a decoder 220 having a decoding program. The decoder 220 is preferably provided on the logic board 217 as shown by FIG. 2a. The decoder can also be provided within the host-based processor.

The decoding program can be one of a plurality of 1-D, 2-D and/or 3-D decoding programs for respectively decoding a plurality of 1-D, 2-D and 3-D code symbologies. Each of the decoding programs can be enabled and disabled using conventional programming techniques, such as scanning optical codes or running programming software on the I/O device 313 which is connected to the scan unit 315.

The scan unit 315 may be configured as a handheld, optical coder reader, as shown in FIG. 3a, or alternatively as a stationary or presentation unit. The scan unit 315 includes an LED display panel 311, an activation mechanism 312, and a cable 314 for transferring data to the I/O device 313.

The I/O device 313 can be any type of computing device having input and output functions, such as a personal digital assistant (PDA), a portable data terminal (PDT), a server, a terminal, a personal computer, and a mobile telephone. The I/O device 313 may be incorporated with the scan unit 315. The scan unit 315 can be configured to wirelessly transfer data to the I/O device 313 or other computing devices by a wireless protocol, e.g., IEEE 802.11, Bluetooth, and IrDA. Further, the scan unit 315 can be a PDA, a PDT, a mobile telephone, a finger worn "ring scanner", a writing implement, such as a pen, a stand-alone optical code reader (i.e., not configured to cooperate with any external devices, such as I/O device 313) and numerous other computing devices.

Figure 2B:
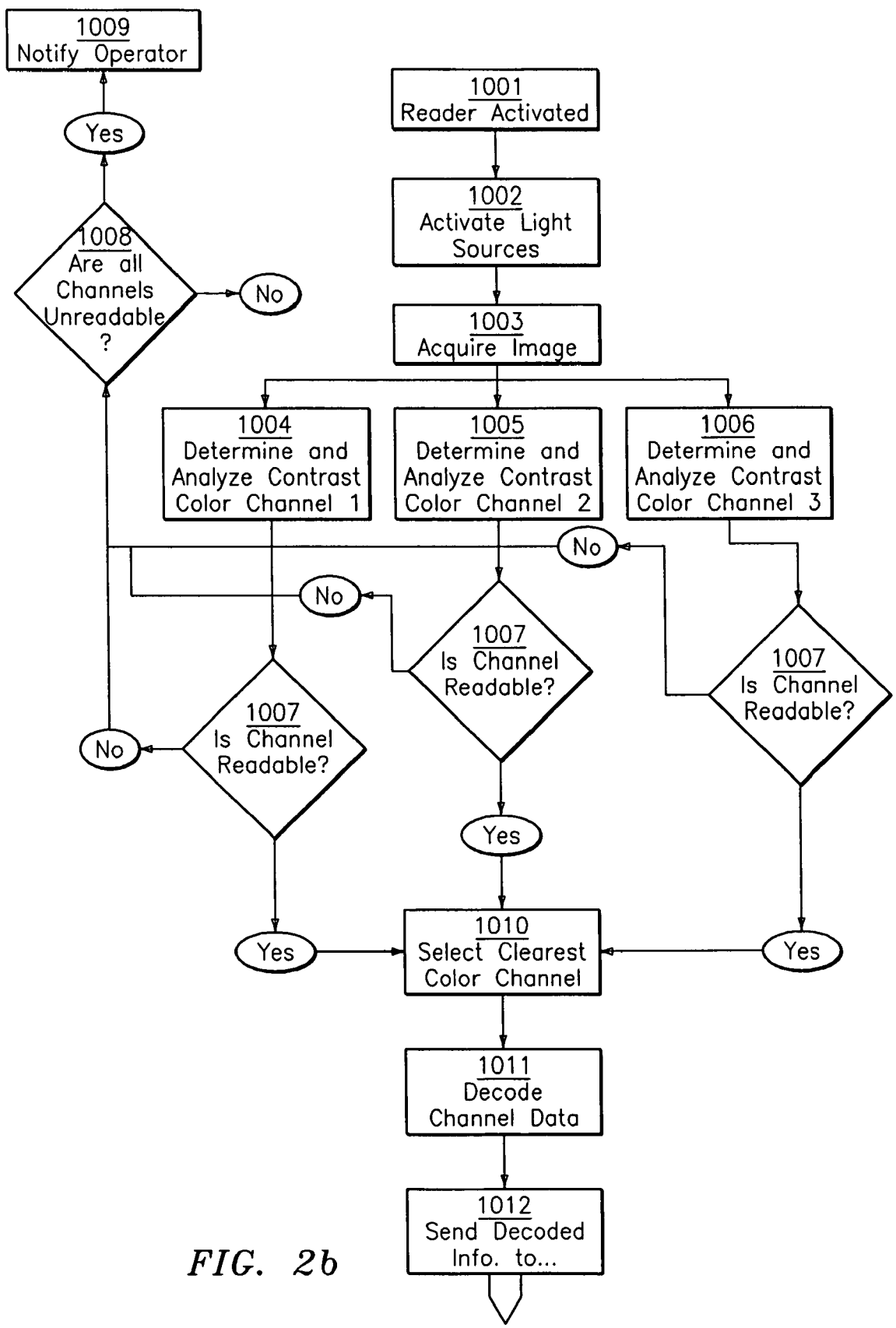

FIG. 2b illustrates a flowchart of the steps performed during an exemplary scan and decode procedure in accordance with one embodiment of the present invention. All the steps described below with reference to FIG. 2b are performed by the scan unit 315. It is, however, contemplated that one or more of the steps may be performed by an external device, such as I/O device 313.

In step 1001, a code scan is initiated via an actuating device, such as activation mechanism 312 of the scan unit 315. The process proceeds to step 1002 where the light sources 210a–c are activated. The process then performs step 1003, where the image sensor 214 acquires the integrated image of the DPM code 215 and relays the image to the processor 212 in the form of an image signal.

The processor 212 separates the image signal into its component color channels each corresponding to a monochrome image of the integrated image. That is, each color channel includes image data representative of the DPM code 215 as imaged during illumination by a particular colored light source of the light sources 210a–c and from an illumination direction indicative of the glancing angle corresponding to that light source. The processor 212 separates the image signal using color separation techniques known in the art.

The contrast of the color channel data corresponding to each color channel are analyzed by the processor 212 at steps 1004–1006 for determining contrast level for each color channel. Steps 1004–1006 are performed substantially simultaneously. The processor 212 further evaluates, during these steps, the contrast for each color channel for determining readability at step 1007. At step 1007, the color channels that are determined to have a contrast below or above a predetermined contrast level (according to how the processor 212 is programmed), or outside a preferred contrast range, are determined to most likely contain unreadable data and hence, would probably cause the scan unit 315 to provide a misread or no read at all.

Step 1008 then determines whether the data corresponding to each color channel is unreadable. If the data corresponding to each color channel has been determined to be unreadable in step 1007, then step 1009 notifies the operator that a readable image was not acquired. The operator may be notified via an audible sound.

Step 1009 may also include providing suggestions to the operator for obtaining a readable (and hence, decodable) image, for example, via the LED display panel 311 (or display 316 of the I/O device 313). The suggestions may include changing the glancing angle corresponding to one or more of the light sources 210a–c, the illumination direction of one or more of the light sources 210a–c, replacing one of the light sources 210a–c with a light source emanating a different color/wavelength, increase or decrease the ambient illumination, etc. After step 1009, the operator may then restart the scan and decode procedure by re-activating the scan unit 315 (step 1001). Alternatively, the scan unit 315 may be programmed to automatically re-scan after step 1008 or 1009.

In step 1010, the color channels that are determined in step 1007 to have readable data, i.e., their respective contrast is below or above the predetermined contrast level, or their respective contrast is outside the preferred contrast range, are then compared. The data corresponding to the color channel having a corresponding contrast which is determined by the comparison to have the most optimum contrast is then selected for decoding in step 1011. In step 1012, the decoded data is sent to any of a number of destinations, such as I/O device 313 via cable 314 for display by display device 316.

The information encoded by the DPM code 215 and decoded by the decoder 220 of the optical code reading and decoding system 300 may be an identifying string of alpha-numeric characters or a data file. The retrieved information can be processed in a manner appropriate for a particular application, which may include using the retrieved information for looking up data stored in a database and/or adding the retrieved information to a product tracking system, such as a database or inventory system.

As noted above, the scan and decode procedure shown by FIG. 2b is an exemplary procedure in accordance with the present invention. Accordingly, it is envisioned that the procedure can be modified within the scope and spirit of the present invention, such that besides determining contrast for each color channel, other color specific and non-color specific parameters may be used and/or determined for determining readability of the imaged DPM code 215.

Figure 5:
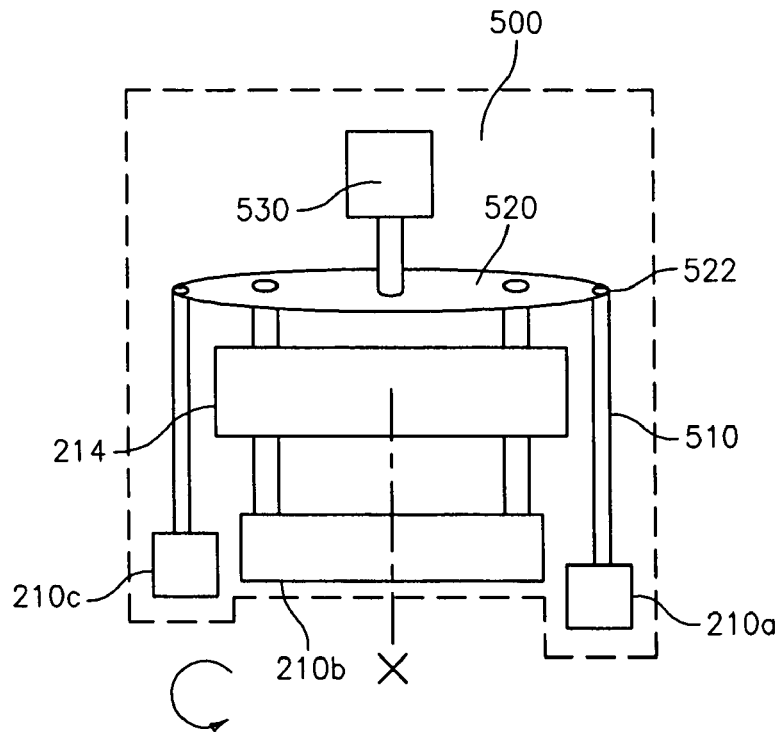
FIG. 5 is a schematic view of an alternate optical code reading system having a light source rotation mechanism in accordance with the present invention.

FIG. 5 illustrates an exemplary mechanism designated generally by reference numeral 500 for rotating the light sources 210a–c about an optical axis-X of the scan unit in accordance with an additional embodiment for the scan unit 315. Each light source is connected to a support rod 510 which is mounted to a disk 520 via mounting pins 522. The disk 520 in turn is mounted to a servo-mechanical motor 530 capable of being energized for rotating the disk 520, either clockwise or counter-clockwise depending on design choice. As the disk 520 rotates, all the light sources 210a–c are rotated about optical axis-X and image sensor 214.

The motor 530 can be controlled either automatically by the logic board 217 (FIG. 2a) or manually by the user, for example, by pressing an on/off switch electrically coupled to the motor 530. It is contemplated that the light sources 210a–c can be removed from the disk 520 for maintenance or for replacement by other light sources. It is further contemplated that the entire rotational mechanism 500 can be removed for maintenance or for replacement by another mechanism, either identical or different.

Figure 6:
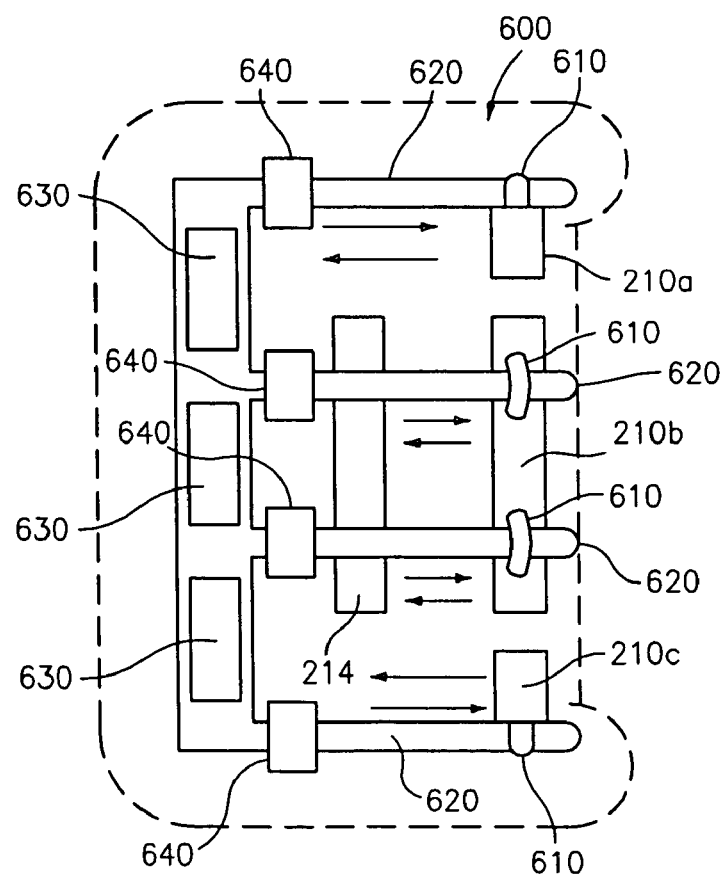
FIG. 6 is a schematic view of an alternate optical code reading system having a light source elevation adjustment mechanism in accordance with the present invention.

FIG. 6 illustrates an exemplary mechanism designated generally by reference numeral 600 for elevating and de-elevating the light sources 210a–c as shown by the arrows in accordance with an additional embodiment for the scan unit 315. The elevation mechanism 600 is controlled by the logic board 217 (FIG. 2a) or manually, in order to achieve an optimal illumination angle of at least one of the light sources 210a–c to the DPM code 215. The elevation mechanism 600 includes coupling elements 610 fixedly connecting the light sources 210a–c to two respective telescopic supporting rods 620.

The telescopic supporting rods 620 are controlled by servo-mechanical motors 630, as known in the art for controlling the expansion and contraction of an automobile antenna, for expanding away or contracting towards their respective base 640. As the telescopic supporting rods 620 expand and contract, the elevation of the light sources 210a–c changes accordingly. FIG. 6 illustrates the light sources 210a–c near their highest elevation point.

The elevation mechanism 600 allows for the adjustment of the glancing angle for achieving an optimal illumination angle. The optimal illumination angle can be determined by the logic board 217 through the analysis of image data generated by the image sensor 214. It is contemplated that elevation of all the light sources 210a–c using elevation mechanism 600 is performed simultaneously. It is further contemplated that one or two light sources can be elevated and/or de-elevated while the other two or one light source, respectively, remain(s) stationary.

Figure 7:
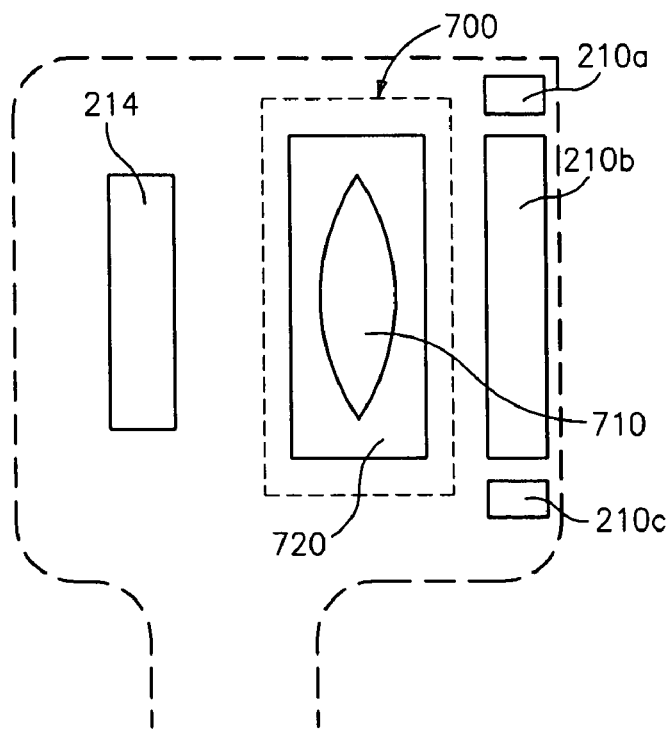
FIG. 7 is a schematic view of an alternate optical code reading system having an automatic focus assembly in accordance with the present invention.

An additional embodiment for the scan unit 315 in accordance with the present invention is shown in FIG. 7. This embodiment includes an automatic focus mechanism 700 for focusing an image of the DPM code 215 onto the image sensor 214. The automatic focus mechanism 700, enclosed within the scan unit, includes a lens 710 and a distance determining assembly 720 as known in the art, as well as associated control circuitry, which could be incorporated into the logic board 217. The lens 710 is configured for being moved with respect to the DPM code 215 according to the distance between the image sensor 214 and the DPM code 215 as determined by the distance determining assembly 720. The automatic focus system 700 is of the type known in the art for focusing an image onto an image sensor.

Figure 8:
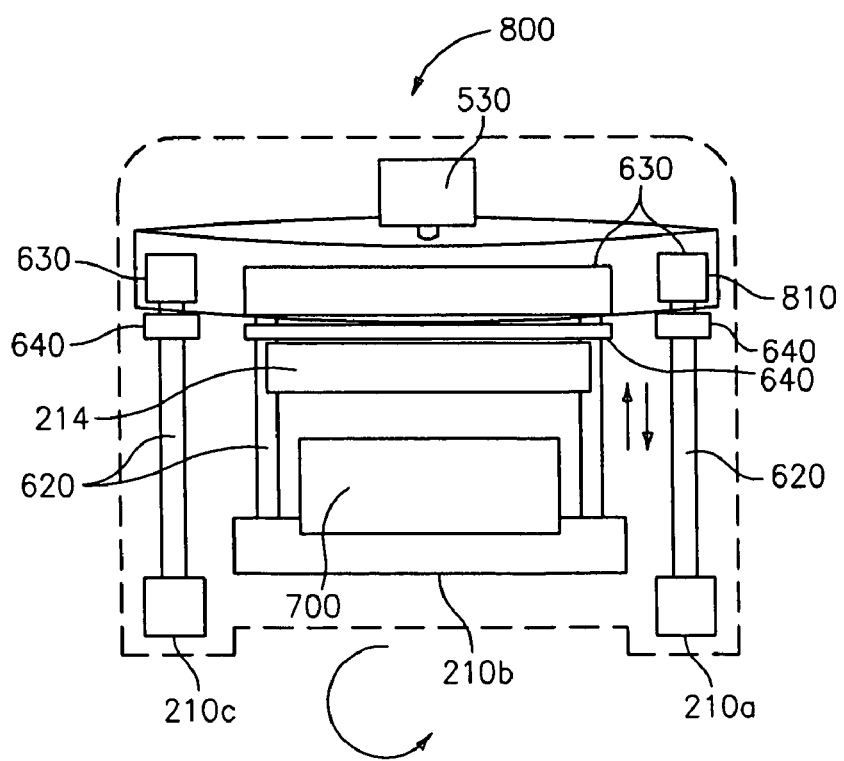
FIG. 8 is a schematic view of an alternate optical code reading system having an automatic focus assembly, a light source elevation adjustment mechanism, and a light source rotation mechanism in accordance with the present invention.

FIG. 8 illustrates an alternate, exemplary embodiment for the scan unit 315 in which the optical code reading and decoding system 300 provides a scan unit housing and integrating the 15 mechanisms shown in FIGS. 5–7 for performing the features discussed above with respect to those mechanisms. The scan unit designated generally by reference numeral 800 houses the light sources 210a–c and integrates the rotation mechanism 500, the elevation mechanism 600, and the automatic focus mechanism 700 for elevating and/or rotating the light sources 210a–c and also automatically focusing the image of the DPM code 215 during a scan and decode procedure (see FIG. 9). The servo-mechanism motor 530 is configured for being able to control the operation of servo-mechanical motors 630 housed within rotating platform 810, as well as controlling the rotation of the rotating platform 810, either clockwise or counter-clockwise depending on design choice. The rotating platform 810 replaces the rotating disk 520 in the integrated embodiment shown in FIG. 8.

The rotation and elevation mechanisms 500, 600 can be automatically activated simultaneously or non-simultaneously by the logic board 217 or the host processor or manually for controlling the angular and/or elevation position, respectively, of at least one of the light sources 210a–c. FIG. 8 illustrates the light sources 210a–c near their highest elevation point. The automatic focus mechanism 800 is controlled by the logic board 217 for focusing the image of the DPM code 215 onto the image sensor 214.

In the embodiment shown in FIG. 8, the logic board 217 or host processor is preferably programmed with optimal illumination intensities, glancing angles and other parameters for each light source as a default or preferred setting. After the system 800 is turned on, each light source is set according to its respective stored illumination settings for illuminating the DPM code 215. If the optical code reading system 800 has not acquired a readable, i.e. decodable, image after cycling through the stored illumination settings, the reading system 800 initiates, manually or automatically, a trial and error imaging procedure where the light sources 210a–c are rotated and/or elevation adjusted individually or simultaneously, and/or the image of the DPM code 215 is focused, until a decodable image of the DPM code 215 is determined by the processor 212 or host processor to have been obtained.

Figure 9:
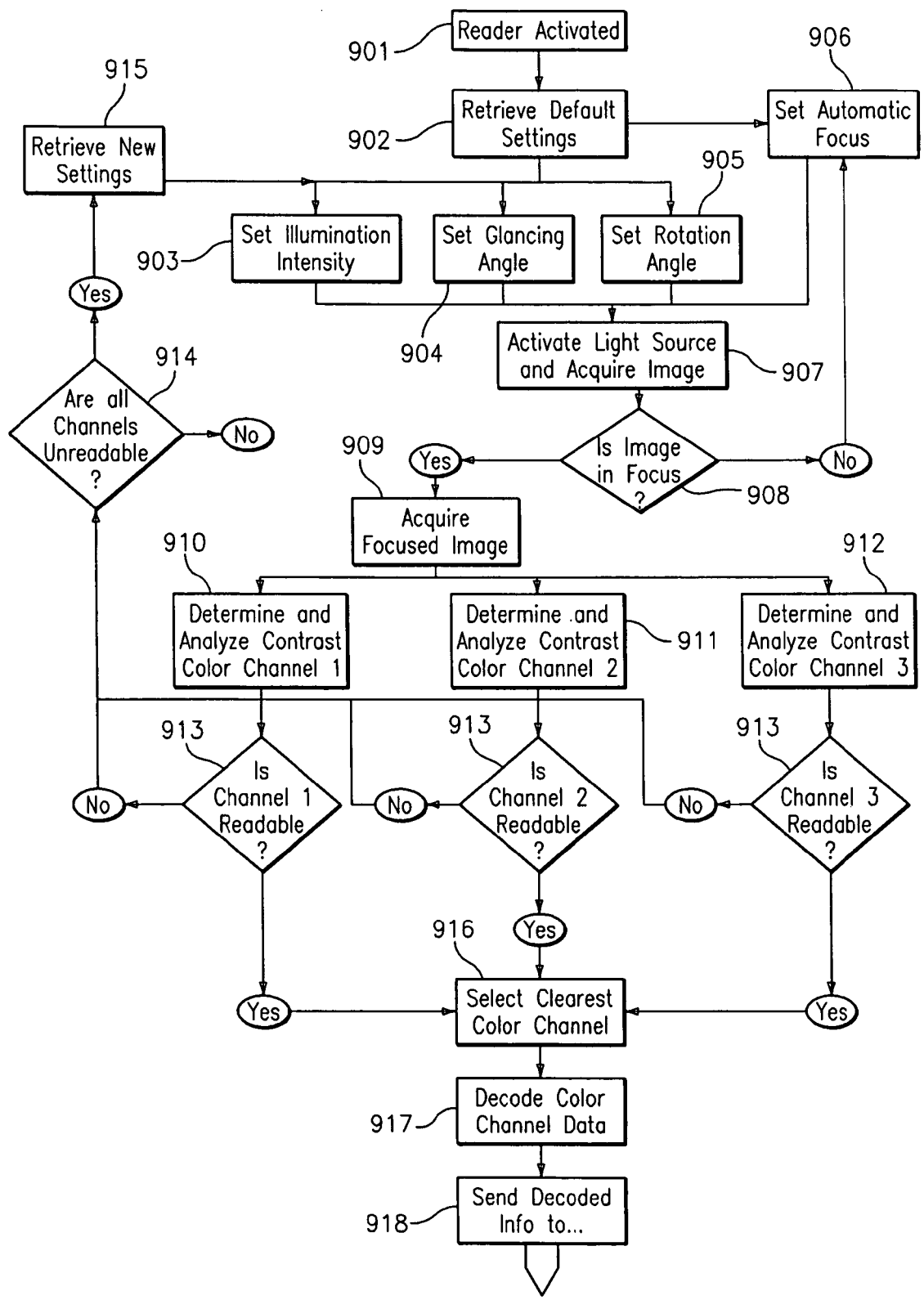
FIG. 9 illustrates a flowchart of an exemplary method of operation of the optical code reading system as shown in FIG. 8.

FIG. 9 illustrates a flowchart of the steps performed during an exemplary scan and decode procedure using the embodiment shown in FIG. 8 in accordance with one embodiment of the present invention. All the steps described below with reference to FIG. 9 are performed by a scan unit, such as scan unit 315. It is, however, contemplated that one or more of the steps may be performed by an external device, such as I/O device 313.

In step 901, a code scan is initiated via an actuating device, such as activation mechanism 312 of the scan unit 315. The process proceeds to step 902, where the processor retrieves a set of default settings from either an internal (e.g., RAM) or external memory storage device (e.g., I/O device 313). The default settings are used in step 903 for setting the light source illumination intensities; in step 904, for setting the glancing angle; in step 905, for setting the rotational position; and in step 906, for setting the automatic focus mechanism 700. Steps 903–906 can be performed sequentially in any order or simultaneously.

It is noted that in step 903, the illumination intensity for each light source is set by buffering in a buffer of the processor 212 the value of the illumination intensity corresponding to each light source. The illumination intensity for each light source is not physically set to the buffered value until step 907. However, to an observer, steps 903 and 907 appear to occur simultaneously.

Once the settings are set to the default settings, the process proceeds to step 907 where the light sources 210a–c are activated and the image is acquired. The focus quality of the acquired image is determined and analyzed by the processor 212 in step 908. If the focus quality is determined to be less than satisfactory, i.e., the image does not have an acceptable focus, then, in step 906, the automatic focus mechanism 700 is actuated for focusing the image, including determining the distance to the DPM code 215, if necessary, for focusing the image. Step 907 is then repeated. Steps 906 and 907 may be repeated two or more times until it is determined by the processor 212 that the focus quality is suitable for decoding the image data corresponding to the focused image.

The process then proceeds to step 909 where the image sensor acquires the focused image and relays the focused image to the processor 212 in the form of an image signal. The processor 212 separates the image signal into its component color channels using color separation techniques known in the art. Each color channel includes image data representative of the DPM code 215 as imaged during illumination by a particular colored light source of the light sources 210a–c and from an illumination direction indicative of the glancing angle corresponding to that light source.

The contrast of the color channel data corresponding to each color channel are analyzed by the processor 212 at steps 910–912 for determining contrast level for each color channel. Steps 910–912 are performed substantially simultaneously. The processor 212 further during these steps evaluates the contrast for each color channel for determining readability at step 913. At step 913, the color channels that are determined to have a contrast below or above a predetermined contrast level (according to how the processor 212 is programmed), or outside a preferred contrast range are determined to most likely contain unreadable data and hence, would probably cause the scan unit 315 to provide a misread or no read at all.

Step 914 then determines whether the data corresponding to each color channel is unreadable. If the data corresponding to each color channel has been determined to be unreadable in step 913, then the process proceeds to step 915 where new settings are retrieved and the process proceeds to steps 903–905 before proceeding to step 907.

In step 916, the color channels that are determined to have readable data in step 913, i.e., their respective contrast is below or above the predetermined contrast level, or their respective contrast is outside the preferred contrast range, are then compared. The data corresponding to the color channel having a corresponding contrast which is determined by the comparison to have the most optimum contrast is then selected for decoding by the decoder 220 in step 917. In step 918, the decoded data is sent to any of a number of destinations, such as I/O device 313 via cable 314 for display by display device 316.

The information encoded by the DPM code 215 and decoded by the decoder 220 may be an identifying string of alphanumeric characters or a data file. The decoded information can be processed in a manner appropriate for a particular application, which may include using the decoded information for retrieving data stored in a database, such as the I/O device 313, and/or adding the decoded information to a product tracking system, such as a database or inventory system.

As noted above, the scan and decode procedure shown by FIG. 9 is an exemplary procedure in accordance with the present invention. Accordingly, it is envisioned that the procedure can be modified within the scope and spirit of the present invention, such that besides determining contrast for each color channel, other color specific and non-color specific parameters may be used and/or determined for determining readability of the imaged DPM code 215.

The system and method of the present invention as described herein utilize a color image sensor for enabling the simultaneous acquisition of three differently colored images as a superimposed, integrated image. The images correspond to different wavelength/color light sources provided in three banks of LEDs and oriented for providing illumination from three different illumination directions. The images are acquired simultaneously, thereby decreasing overall image acquisition time by as much as 66% compared to prior art direct part mark imaging systems. The system and method further determine which image of the three images is an optimum decodable image and decode at least a portion of the optimum decodable image for decoding data encoded by the DPM code 215.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical code reading and decoding system comprising:
   a plurality of light sources for emanating a respective wavelength/color of light towards an optical code on an externally located target surface, wherein at least two of the plurality of light sources emanate different wavelengths/colors of light;
   an image sensor for generating an integrated image of the optical code, said integrated image having at least two simultaneously acquired monochrome images each corresponding to a respective one of the plurality of light sources;
   a processor for separating said integrated image into said at least two monochrome images and analyzing at least one parameter corresponding to the at least two monochrome images and determining at least one decodable monochrome image; and
   a decoder for decoding at least a portion of said at least one decodable monochrome image.

2. The optical code reading and decoding system as in claim 1, wherein said optical code is a DPM code.

3. The optical code reading and decoding system as in claim 1, wherein said plurality of light sources emanate a respective wavelength/color of light selected from the group consisting of red, green, blue, infrared and ultraviolet.

4. The optical code reading and decoding system as in claim 1, wherein the at least one parameter is contrast.

5. The optical code reading and decoding system as in claim 1, further comprising a positional adjustment mechanism configured for moving each of the plurality of light sources.

6. The optical code reading and decoding system as in claim 5, wherein the positional adjustment mechanism includes a rotation mechanism for rotating the plurality of light sources.

7. The optical code reading and decoding system as in claim 5, wherein the positional adjustment mechanism includes an elevation mechanism for elevating and de-elevating the plurality of light sources.

8. The optical code reading and decoding system as in claim 1, further comprising an automatic focus mechanism for focusing the integrated image of the optical code onto the image sensor.

9. The optical code reading and decoding system as in claim 1, wherein the plurality of light sources are provided in an arrangement selected from the group consisting of U-shaped, triangular and circular arrangements.

10. The optical code reading and decoding system as in claim 1, wherein the processor is programmed with default settings for each of the plurality of light sources.

11. The optical code reading and decoding system as in claim 10, wherein the default settings include illumination intensity and glancing angle settings for each of the plurality of light sources.

12. The optical code reading and decoding system as in claim 1, further comprising at least one sensor for sensing at least one parameter for controlling illumination intensity for each of the plurality of light sources.

13. The optical code reading and decoding system as in claim 1, further comprising a display for providing at least one suggestion fur acquiring the decodable image of the integrated image.

14. The optical code reading and decoding system as in claim 1, wherein said system is an optical code reader and wherein the plurality of light sources are housed within and removably mounted to said optical code reader.

15. The optical code reading and decoding system as in claim 1, further comprising a feedback system having means for automatically setting at least one characteristic of said optical code reading system.

16. The optical code reading and decoding system as in claim 1, further comprising an information system storing information related to an item, said information capable of being retrieved after decoding said at least a portion of said at least one decodable monochrome image.

17. A method for reading and decoding an optical code comprising the steps of:
   illuminating an optical code on a target surface by emanating a plurality of wavelengths/colors of light towards the optical code, wherein at least two of the wavelengths/colors of light are different;
   generating an integrated image of the optical code, said integrated image having at least two simultaneously acquired monochrome images each corresponding to a respective one of the wavelengths/colors of light; and
   decoding at least a portion of at least one monochrome image of said at least two monochrome images.

18. The method as in claim 17, wherein said optical code is a DPM code.

19. The method as in claim 17, wherein the illuminating step comprises the step of positioning a plurality of light sources in proximity to the optical code, each of said plurality of light sources configured to emanate one of the plurality of wavelengths/colors of light.

20. The method as in claim 19, further comprising the step of adjusting the position of the plurality of light sources with respect to the optical code.

21. The method as in claim 19, further comprising the step of sensing at least one parameter for controlling illumination intensity for each of the plurality of light sources.

22. The method as in claim 19, further comprising the step of automatically setting at least one characteristic of said plurality of light sources.

23. The method as in claim 17, wherein the step of generating the integrated image comprises the step of automatically focusing the integrated image onto an image sensor.

24. The method as in claim 17, further comprising the step of analyzing at least one parameter corresponding to each of the at least two monochrome images and determining at least one decodable image of tube at least two monochrome images, wherein said at least one decodable image includes the image where the at least a portion thereof is decoded by said decoding step.

25. The method as in claim 24, wherein said at least one parameter is contrast.

26. The method as in claim 24, wherein the step of analyzing the at least one parameter comprises the step of separating the integrated image in individual color channels each corresponding to a respective image of the at least two monochrome images, including the image where the at least a portion thereof is decoded by said decoding step.

27. An optical code reader comprising:
   a scanning unit housing a plurality of light sources;
   an activation mechanism for actuating said plurality of light sources for emanating a respective wavelength/color of light towards an optical code on an externally located target surface, wherein at least two of the plurality of light sources emanate different wavelengths/colors of light;
   an image sensor for generating an integrated image of the optical code, said integrated image having at least two simultaneously acquired monochrome images corresponding to a respective one of the plurality of light sources;
   means for separating said integrated image into said at least two monochrome images and analyzing at least one parameter corresponding to the at least two monochrome images and determining at least one decodable monochrome image; and
   a decoder for decoding at least a portion of said at least one decodable monochrome image.

28. The optical code reader as in claim 27, wherein said optical code is a DPM code.

29. The optical code reader as in claim 27, wherein said plurality of light sources emanate a respective wavelength/color of light selected from the group consisting of red, green, blue, infrared and ultraviolet.

30. The optical code reader as in claim 27, wherein the at least one parameter is contrast.

31. The optical code reader as in claim 27, further comprising a positional adjustment mechanism configured for moving each of the plurality of light sources.

32. The optical code reader as in claim 31, wherein the positional adjustment mechanism includes a rotation mechanism for rotating the plurality of light sources.

33. The optical code reader as in claim 31, wherein the positional adjustment mechanism includes an elevation mechanism for elevating and de-elevating the plurality of light sources.

34. The optical code reader as in claim 27, further comprising an automatic focus mechanism for focusing the integrated image of the optical code onto the image sensor.

35. The optical code reader as in claim 27, wherein the plurality of light sources are provided in an arrangement selected from the group consisting of U-shaped, triangular and circular arrangements.

36. The optical code reader as in claim 27, wherein the means for analyzing includes a processor programmed with default settings for each of the plurality of light sources.

37. The optical code reader as in claim 36, wherein the default settings include illumination intensity and glancing angle settings for each of the plurality of light sources.

38. The optical code reader as in claim 27, further comprising at least one sensor for sensing at least one parameter for controlling illumination intensity for each of the plurality of light sources.

39. The optical code reader as in claim 27, further comprising a display for providing at least one suggestion for acquiring the decodable image of the integrated image.

40. The optical code reader as in claim 27, wherein the plurality of light sources are housed within and removably mounted to the optical code reader.

41. The optical code reader as in claim 27, further comprising a feedback system having means for automatically setting at least one characteristic of said optical code reader.

* * * * *